No. 737,838. PATENTED SEPT. 1, 1903.
S. C. HIRSCHBERG.
SHIELDED CLINICAL THERMOMETER AND PROCESS OF MAKING SAME.
APPLICATION FILED JAN. 27, 1903.
NO MODEL.
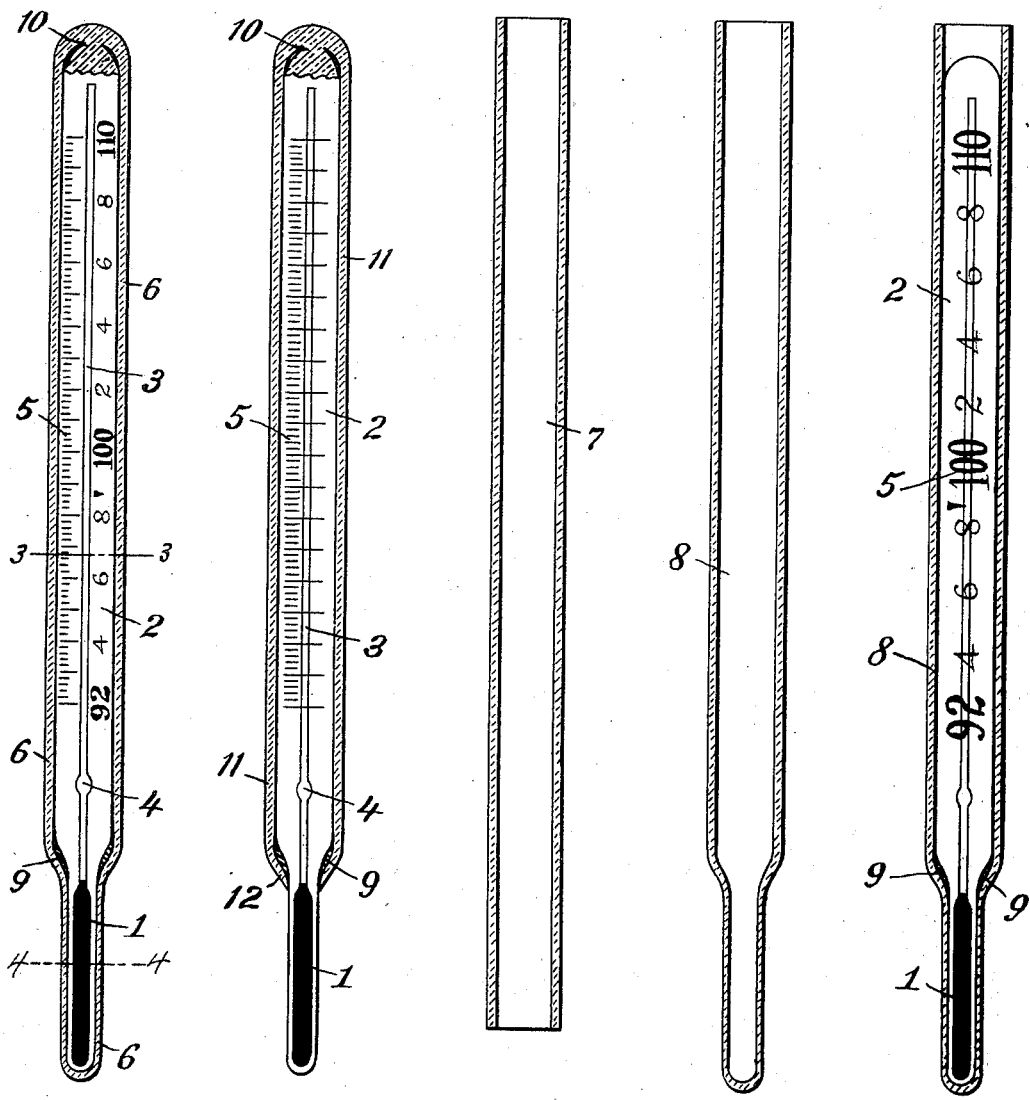
WITNESSES:
INVENTOR No. 737,838. Patented September 1, 1903.

UNITED STATES PATENT OFFICE.

SOLOMON CHARLES HIRSCHBERG, OF NEW YORK, N. Y.

SHIELDED CLINICAL THERMOMETER AND PROCESS OF MAKING SAME.

SPECIFICATION forming part of Letters Patent No. 737,838, dated September 1, 1903.

Application filed January 27, 1903. Serial No. 140,745. (No model.)

*To all whom it may concern:*

Be it known that I, SOLOMON CHARLES HIRSCHBERG, a citizen of the United States of America, and a resident of the city, county, and State of New York, have invented certain new and useful Improvements in Shielded Clinical Thermometers and Processes of Making the Same, of which the following is a specification.

The medical profession universally acknowledges the necessity of using a clinical thermometer which will not secrete disease germs and convey them from one patient to another. It is also conceded that the registering-scale of a thermometer should always fully retain its original clearness to assure quick and easy reading of the scale after temperatures are taken. It is also desirable that the thermometer offer no ridges or roughness of exterior surface to muscular tissues or parts with which it may come in contact. It also is advantageous to give maximum strength to the thermometer to avoid easy breaking of these fragile instruments by ordinary handling or use while maintaining necessary sensitiveness to enable temperatures to be taken in the brief time usually alloted by reputable physicians for this purpose. It also is very desirable that provision be made for quickly and cheaply replacing a broken thermometer-shield by a new one without impairing the accurate registration of the instrument.

It is the object of my invention to provide a clinical thermometer, one more particularly of the magnifying and maximum-temperature-registering class, which fulfils all the above-named requirements and possesses the aforesaid advantages to a degree not heretofore attained in instruments of this character.

In its preferred embodiment the invention includes a clinical thermometer having an inner mercury or fluid tube comprising a bulb-reservoir and a communicating bored stem having a registering-scale and an outer shield through which the tube-scale is visible and which preferably completely covers or wholly envelops the thermometer-tube and protects it from disease germs and from effacement of its registering-scale and presents no rough surfaces to the patient and avoids easy breakage by ordinary handling or use, the latter advantage being more completely attained by a yielding or elastic packing made, preferably, of rubber and interposed between the tube and shield. In the thermometer having only a partial shield which protects its registering-scale the elastic packing also assures an absolutely tight germ and moisture proof closure of the joint between the forward ends of the thermometer-tube and shield.

The invention also includes the method of forming the preferred glass shield and applying it to the thermometer-tube in manner avoiding the always damaging application of glass-fusing heat at or near its bulb, and therefore assuring maintenance of unfailing accuracy of the previously-formed registering-scale of the tube relatively to the mercury column and permitting inexpensive renewal of a broken shield or permitting a shield to be applied to any ordinary clinical thermometer which never has been so protected.

The invention will first be described and then will be particularly defined in claims hereinafter set forth.

Reference is made to the accompanying drawings, forming part of this specification, and in which—

Figure 1 is an enlarged vertical sectional elevation of a magnifying maximum-temperature-registering thermometer-tube provided with the preferred wholly-enveloping glass shield and with elastic packing interposed between the tube and shield. Fig. 2 is a vertical sectional elevation of a similar thermometer-tube having a partial shield protecting its registering-scale and with elastic packing applied between the tube and shield. Fig. 3 is a cross-section taken on the line 3 3 in Fig. 1. Fig. 4 is a cross-section taken on the line 4 4 in Fig. 1. Figs. 5, 6, and 7, with Fig. 1, sufficiently illustrate the preferred process of forming a transparent glass shield and applying it to a thermometer-tube. Fig. 5 is a longitudinal section of a piece of glass tubing used for this shield. Fig. 6 shows this tubing drawn out smaller and closed at one end to fit the mercury or fluid bulb of the thermometer-tube, and Fig. 7 shows a thermometer-tube having elastic packing inserted in the shield prior to closing the shield by fusion and preferably at the same time fusing the tube and shield together at their rear ends to complete the instrument.

The glass thermometer-tube comprises a hollow bulb 1, forming a mercury or fluid reservoir, and a stem 2, having a small bore 3, communicating with the fluid-chamber of the bulb. This stem-bore 3 preferably has an expanded air-chamber 4, causing the tube to retain the mercury or fluid column at the maximum registered point for later reading and giving this thermometer the well-known maximum-temperature-registering quality above named and requiring shaking of the thermometer after use to again settle the indicating fluid to its normal lowest limit. The tube-stem also preferably has angular or prismatic cross-sectional form, giving it the well-known magnifying function to aid in reading the height of the fluid column at the scale 5, which is usually etched or cut into the stem and is preferably filled with coloring-matter, making the scale more easily readable.

It is not new to cover the graduated stem portion of a thermometer-tube with a transparent shield of glass with a view to preventing dislodgement of the coloring-matter from the etched scale or for excluding disease germs from said scale; but these objects are accomplished much more satisfactorily than heretofore by my invention, which also includes various advantages residing in the protecting-shield itself and in the arrangement of an elastic or yielding shock-relieving packing between the scale-marked thermometer-tube and the shield, this elastic packing being equally well adapted to a thermometer having a shield covering both its registering-scale and fluid-bulb or to a thermometer having a shield covering only its registering-scale.

In making the preferred wholly-enveloping shield 6 of glass in the preferred manner a piece of transparent glass tubing 7 (shown in Fig. 5 of the drawings) is drawn down at one end to smaller diameter, its walls being preferably thinned in the process, and the extremity of this contracted end is then closed by fusion, as shown by the partially-formed shield 8 in Fig. 6 of the drawings. The thermometer-tube 1 2 is then slipped into this partially-formed shield, and special attention is given to obtaining a close fit of the tube-bulb 1 within the walls of the forward contracted end portion of the shield in order to avoid air-space between the bulb and shield, and thereby promote or assure the sensitiveness of the instrument when taking the temperature of a patient. This fitting is done by softening the shield by heat and then contracting or expanding it after trying the tube therein when the shield cools after each manipulation, the heat thus always being applied to the shield and not to the tube. After fitting the shield to the tube as above described a suitable elastic packing 9 is placed upon the tube, preferably at the shoulder next the junction of the bulb and stem. This packing may originally be formed as a perforated disk or washer, of rubber or other suitable elastic or yielding material, or may be a short piece of elastic tubing, in either case preferably having a hole smaller than the diameter of the bulb 1, so that it must be forced over the bulb to lodge finally against the shoulder. After this elastic packing is thus applied to the tube the latter is slipped into the fitted shield and is forced forward therein to compress the packing between opposing shoulders of the tube and shield, as indicated in Fig. 7 of the drawings. The rear end of the shield then is closed, preferably, by fusion, and preferably at the same time the rear ends of the tube and shield are fused together, as shown at 10, to seal the tube within the shield and positively or immovably connect the rear ends of the tube and shield, thereby producing the complete finished thermometer having the preferred wholly-enveloping transparent glass shield. (Shown in Fig. 1 of the drawings.) Instead of closing the rear end of the shield by fusing it or by fusing the shield and tube together, as above described, I may close or seal the shield in any other approved manner. Obviously that portion 6 of the shield covering the tube-bulb 1 may be made of a separate piece of thin-walled glass tubing fused to a contracted forward end of the larger portion of the shield covering the scale-marks on the tube-stem 2 instead of drawing the forward end of the preferred one-piece shield-tube 7 down to smaller diameter to fit the bulb.

In making and applying the preferred partial transparent shield 11 (shown in Fig. 2 of the drawings) a piece of glass tubing like that shown in Fig. 5 of the drawings, but a little shorter, is manipulated under heat to contract its forward end 12 to make it closely fit the tube-bulb 1, the shield when cooled after each manipulation being tried on the tube to assure a good fit. The elastic packing 9 then is applied to the tube at its shoulder, and the tube then is passed forward bulb first into this partial shield, and after compressing the packing between opposing shoulders of the shield and tube behind the projecting and exposed bulb the rear end of the shield is closed, preferably, by fusion, and preferably at the same time the rear ends of the tube and shield are fused together at 10; but the rear end of this partial shield may be closed in any other approved manner, substantially as above described for the shield shown in Fig. 1 of the drawings.

The special advantages of the preferred thermometer (shown in Fig. 1 of the drawings) may be summarized as follows:

The shield portion covering the thermometer-bulb 1 protects this fragile bulb from injury by shocks during handling or use of the instrument, while not interfering with accurate temperature registration within the usual time allowed by reputable physicians, which is from three to five minutes. My thermometer having its bulb inclosed by a protecting-shield will accurately register a patient's temperature within two minutes or in less time. Hence covering the bulb by the shield works no disadvantage in using the instrument, while giving a large measure of protection against breakage of the bulb.

A further advantage is that there is no laterally-projecting bead or cement packing or roughness at the exterior surface of forward parts of the thermometer as in former instruments having a partial scale-protecting glass shield. Hence no pain or injury can result from passing my thermometer among inflamed tissues or parts.

Another advantage is that the wholly-enveloping shield, especially when its forward portion covering the bulb is drawn from one piece of glass tubing, as above described, presents no exterior roughness or wrinkles or crevices, but is smooth throughout, and therefore offers practically no opportunity for permanent lodgment of disease germs and may be quickly and antiseptically cleansed in any acid or other solution commonly used for this purpose, and germs or cleansing solution or other foreign matter can never pass between the shield and tube to obscure the registering-scale on the tube.

A further and important advantage is that in view of the use of glass-fusing heat only at the rear end of the instrument for closing the shield and preferably fixedly connecting the shield to the tube at that point this wholly-enveloping glass shield if accidentally broken can quickly and cheaply be replaced by a new shield after the old one is chipped away at its point of fusion with the tube should such fusion exist or after simply slipping the shield from the tube should it not be fused thereto. This wholly-enveloping glass shield may also be quickly and cheaply applied to any clinical thermometer not originally having such protection and without injuriously affecting its accuracy of registration.

A final advantage attained by using the elastic or yielding packing within the wholly-enveloping glass shield is that shocks incident to handling or use are far less liable to break the fragile instrument at its bulb or elsewhere.

The novel method of applying the partial glass shield 11 to the thermometer-tube involves the use of heat only at the rear end of the shield where it is preferably fused to close it and also preferably fuse it to the scale-marked tube. A prior partial transparent glass shield was slipped upon a scale-marked thermometer-tube and was then fused to it at the rear end, and heat then was applied at its forward end to mold and fit the shield to the tube within a recess just behind the bulb, and cement then was applied at the forward end of this prior partial shield with the object of excluding disease germs and cleansing solution from the registering-scale on the tube. This cement is liable to crumble or to be dissolved in acid-cleansing solution, thereby causing this instrument to lose its proposed germ-proof character and to admit germs and cleansing solution or scale-blurring foreign matter between the shield and tube. Any such crumbling or dissolving of the cement also causes the shield to become loose on the tube, thus enhancing the danger of breaking the shield or tube, or both of them. By using the elastic packing 9 in this partial shield, which is fitted to the tube without heating the latter at or near its fluid-bulb, and by fusing the tube and shield together at their rear ends after the shield is fitted at its forward end to the tube these disadvantages of the prior partial shield are avoided and a partially-shielded thermometer is produced which may be freely handled and used with much less danger of breaking it, because of the use of the elastic packing between the tube and shield, while at the same time this packing positively excludes germs or cleansing solutions or moisture from lodgment between the shield and tube to avoid blurring the temperature-registering scale on the tube and also avoids loosening of the forward end of the shield near the fluid-bulb. This partial shield having the elastic packing may also be easily and cheaply renewed if broken, or said partial shield having the elastic packing may be applied to a clinical thermometer not originally having a shield.

Another prior thermometer has a partial transparent-glass shield on its tube-stem to protect the scale thereon; but this shield is made by severing an outer tube, from the forward end of which the fluid-bulb is formed, at a point in rear of its fused connection to the extreme forward end of the inner tube to allow the scale to be produced on said inner tube, and the severed parts of the shield are then fused together by the aid of heat applied necessarily near the fluid-bulb. This product and process are inherently expensive, and the percentage of breakage during manufacture must be quite large. Furthermore, the application of heat near the bulb in joining the severed shield can scarcely fail to alter the length of the inner fluid-tube and its scale and make this instrument register inaccurately.

Special mention is made of the method of fusing either the preferred wholly-enveloping glass shield or the preferred partial glass shield to the thermometer-tube at its rear end or at a point in rear of the registering-scale formed on the tube and far enough removed from the fluid-bulb to wholly avoid the use of heat for any purpose at or near the bulb. Heat thus misapplied cannot fail to impair the accuracy of the registering-scale by contracting the tube, and with heat so used there also is danger of more or less closing the fine bore of the tube and of also impairing or destroying the magnifying effect of the scale-marked tube by disturbing the original disposal of the light-passing molecules of the glass.

It is not essential that the tube-shields be made of transparent glass in the preferred manner hereinbefore described, as any other suitable incasing material may be used for the shield which will protect the tube and permit convenient reading of the registering-scale of the instrument. Should material other than glass be used for the shield, the preferred positive or substantially rigid connection of the rear ends of the tube and shield may be made in any approved manner, and the positive connection of the glass thermometer-tube and shield may be made otherwise than by fusing their rear ends together in the preferred manner above described, or no positive connection of the rear ends of the tube and shield need be made, and elastic packing may be used at different places along the tube whether the shield be made to cover and protect both the tube scale-marks and its fluid-bulb or be made to cover and protect only the registering-scale of the tube.

I claim as my invention—

1. A thermometer comprising a scale-marked temperature-registering tube and a shield permanently covering the scale-marks and fluid-bulb of the tube and through which shield the tube-scale is visible.

2. A thermometer comprising a scale-marked temperature-registering tube and a shield permanently and wholly enveloping said tube and through which shield the tube-scale is visible.

3. A thermometer comprising a scale-marked temperature-registering tube and a transparent-glass shield permanently covering the scale-marks and fluid-bulb of the tube.

4. A thermometer comprising a scale-marked temperature-registering tube and a transparent-glass shield permanently and wholly enveloping said tube.

5. A thermometer comprising a scale-marked temperature-registering tube and a shield permanently covering the scale-marks and fluid-bulb of the tube and closely fitting said bulb, and through which shield the tube-scale is visible.

6. A thermometer comprising a scale-marked temperature-registering tube and a shield permanently and wholly enveloping said tube and closely fitting the fluid-bulb of the tube, and through which shield the tube-scale is visible.

7. A thermometer comprising a scale-marked temperature-registering tube and a transparent-glass shield permanently covering the scale-marks and fluid-bulb of the tube and closely fitting said bulb.

8. A thermometer comprising a scale-marked temperature-registering tube and a transparent-glass shield permanently and wholly enveloping said tube and closely fitting the fluid-bulb of the tube.

9. A thermometer comprising a scale-marked temperature-registering tube, a shield permanently covering the scale-marks of the tube and leaving them visible, and elastic packing interposed between the tube and shield.

10. A thermometer comprising a scale-marked temperature-registering tube, a shield permanently covering the scale-marks and fluid-bulb of the tube and through which shield the tube-scale is visible, and elastic packing interposed between the tube and shield.

11. A thermometer comprising a scale-marked temperature-registering tube, a shield permanently and wholly enveloping said tube and through which shield the tube-scale is visible, and elastic packing interposed between the tube and shield.

12. A thermometer comprising a scale-marked temperature-registering tube, a transparent-glass shield permanently covering the scale-marks of the tube, and elastic packing interposed between the tube and shield.

13. A thermometer comprising a scale-marked temperature-registering tube, a transparent-glass shield permanently covering the scale-marks and fluid-bulb of the tube, and elastic packing interposed between the tube and shield.

14. A thermometer comprising a scale-marked temperature-registering tube, a transparent-glass shield permanently and wholly enveloping said tube, and elastic packing interposed between the tube and shield.

15. A thermometer comprising a scale-marked temperature-registering tube and a transparent-glass shield wholly enveloping said tube and fused to the rear part of the tube.

16. A thermometer comprising a scale-marked temperature-registering tube, a transparent-glass shield wholly enveloping said tube and fused to the rear part of the tube, and elastic packing interposed between forward parts of the tube and shield.

17. A thermometer comprising a scale-marked temperature-registering tube, a transparent-glass shield wholly enveloping said tube and closely fitting the fluid-bulb of the tube and fused to the rear part of the tube, and elastic packing interposed between forward parts of the tube and shield.

18. A thermometer comprising a scale-marked temperature-registering tube, a shield on said tube guarding its indicating-scale and leaving it visible and permanently attached to the tube at its rear part and also fitted to the tube at its forward part, and an elastic packing interposed between forward parts of the tube and shield.

19. The herein-described process of applying a glass shield to a thermometer-tube, which consists in shaping the forward part of the shield to the tube, then inserting the tube in the shield, and then closing the rear end of the shield by fusion, substantially as specified.

20. The herein-described process of applying a glass shield to a thermometer-tube, which consists in shaping the forward part of the shield to the tube, then inserting the tube in the shield, and then closing the rear end of the shield by fusion while simultaneously fusing the rear ends of the tube and shield together, substantially as specified.

21. The herein-described process of applying a wholly-enveloping glass shield to a thermometer-tube, which consists in shaping the forward part of the shield to inclose the fluid-bulb of the tube, then inserting the tube in the shield, and then closing the rear end of the shield by fusion, substantially as specified.

22. The herein-described process of applying a wholly-enveloping glass shield to a thermometer-tube, which consists in shaping the forward part of the shield to inclose the fluid-bulb of the tube, then inserting the tube in the shield, and then closing the rear end of the shield by fusion while simultaneously fusing the rear ends of the tube and shield together, substantially as specified.

23. The herein-described process of applying an elastically-packed glass shield to a thermometer-tube, which consists in shaping the forward part of the shield to the tube, then fitting elastic packing on the tube, then inserting the tube in the shield, and then closing the rear end of the shield by fusion, substantially as specified.

24. The herein-described process of applying a wholly-enveloping and elastically-packed glass shield to a thermometer-tube, which consists in shaping the forward part of the shield to inclose the fluid-bulb of the tube, then fitting elastic packing on the tube, then inserting the tube in the shield, and then closing the rear end of the shield by fusion, substantially as specified.

25. A thermometer, comprising a scale-marked temperature-registering tube and a contracted fluid-bulb, a transparent-glass shield consisting of a tube inclosing the thermometer registering-tube and a contracted and thinned bulb inclosing the fluid-bulb of the thermometer, the shield being permanently secured to the thermometer and having intimate contact therewith.

26. A thermometer, comprising a scale-marked temperature-registering tube and a contracted fluid-bulb, a transparent-glass shield permanently secured to the thermometer and consisting of a tube inclosing and having intimate contact with the thermometer registering-tube and a contracted and thinned bulb inclosing the fluid-bulb of the thermometer and having a substantially airtight contact therewith; and intimate contact of the two tubes.

27. A thermometer, comprising a scale-marked temperature-registering tube and a contracted fluid-bulb, a transparent-glass shield consisting of a tube inclosing the thermometer registering-tube and a contracted and thinned bulb intimately inclosing the fluid-bulb of the thermometer, the ends of the thermometer-tube and shield opposite the bulbs being molecularly united as by fusion.

28. A thermometer, comprising a scale-marked temperature-registering tube and a contracted fluid-bulb, a transparent-glass shield consisting of a tube inclosing and having intimate contact with the thermometer registering-tube and a contracted and thinned bulb inclosing the fluid-bulb of the thermometer and having a substantially airtight contact therewith, the ends of the thermometer-tube and shield opposite the bulbs being molecularly united, as by fusion.

SOLOMON CHARLES HIRSCHBERG.

Witnesses:
OLIVER WILLIAMS,
FREDERICK A. BLOUNT.